US011911716B2

(12) United States Patent
Nagge et al.

(10) Patent No.: US 11,911,716 B2
(45) Date of Patent: Feb. 27, 2024

(54) FLUID REMOVAL SYSTEM FOR A BLOWDOWN VESSEL

(71) Applicant: ENERCORP SAND SOLUTIONS INC., Calgary (CA)

(72) Inventors: Rory Nagge, Calgary (CA); Nikolay Spiridonov, Magnolia, TX (US); Ryan Thomas Bowley, Calgary (CA); Jeffrey Gar Sing Chan, Calgary (CA)

(73) Assignee: ENERCORP ENGINEERED SOLUTIONS INC., Calgary (CA)

(*) Notice: Subject to any disclaimer, the term of this patent is extended or adjusted under 35 U.S.C. 154(b) by 1245 days.

(21) Appl. No.: 16/437,247

(22) Filed: Jun. 11, 2019

(65) Prior Publication Data

US 2019/0374879 A1    Dec. 12, 2019

Related U.S. Application Data

(60) Provisional application No. 62/683,531, filed on Jun. 11, 2018.

(51) Int. Cl.
| | | |
|---|---|---|
| B01D 21/00 | (2006.01) | |
| B01D 21/24 | (2006.01) | |
| B01D 21/34 | (2006.01) | |
| B01D 21/30 | (2006.01) | |
| E21B 43/34 | (2006.01) | |
| E21B 43/26 | (2006.01) | |

(52) U.S. Cl.
CPC ..... *B01D 21/0018* (2013.01); *B01D 21/0012* (2013.01); *B01D 21/2488* (2013.01); *B01D 21/307* (2013.01); *B01D 21/34* (2013.01); *E21B 43/35* (2020.05); *E21B 43/2607* (2020.05)

(58) Field of Classification Search
None
See application file for complete search history.

(56) References Cited

U.S. PATENT DOCUMENTS

| | | | | |
|---|---|---|---|---|
| 4,783,272 | A * | 11/1988 | Patterson | B01D 21/245 |
| | | | | 210/801 |
| 6,315,837 | B1 * | 11/2001 | Barclay | B03B 9/02 |
| | | | | 210/512.1 |
| 9,266,748 | B1 * | 2/2016 | Govindan | C02F 1/08 |
| 10,385,635 | B1 * | 8/2019 | Tucker | E21B 21/066 |
| 2014/0318644 | A1 * | 10/2014 | Hollings | E21B 21/065 |
| | | | | 137/546 |
| 2016/0122209 | A1 * | 5/2016 | Newman, Jr. | B01D 17/0214 |
| | | | | 210/744 |
| 2020/0324323 | A1 * | 10/2020 | Bruntveit | C10G 1/047 |

* cited by examiner

*Primary Examiner* — Jonathan M Peo
(74) *Attorney, Agent, or Firm* — MH2 TECHNOLOGY LAW GROUP, LLP

(57) ABSTRACT

A sand separation system includes a separator configured to separate a multi-phase process fluid into a solids and a fluid. The system also includes a blowdown vessel coupled to the separator. The blowdown vessel is configured to receive the solids and a portion of the fluid from the separator. The system also includes a fluid removal assembly coupled to the blowdown vessel. The fluid removal assembly is configured to drain at least some of the fluid in the blowdown vessel therefrom, substantially without removing the solids from the blowdown vessel.

23 Claims, 10 Drawing Sheets

FLUID REMOVAL SYSTEM FOR A BLOWDOWN VESSEL

CROSS-REFERENCE TO RELATED APPLICATIONS

This application claims priority to U.S. provisional patent application Ser. No. 62/683,531, which was filed on Jun. 11, 2018, and is incorporated herein by reference in its entirety.

BACKGROUND

Oil and gas resources such as shale are accessed using a process called hydraulic fracturing. The fracturing, or "fracking," process begins with drilling a well into a rock formation. This technique further involves injecting a mixture of water, sand, and a small amount of other additives (blend of chemicals) into a well. These fluids typically are about 90 percent water and 9.5 percent sand. Many of the ingredients in the remaining 0.5 percent of the mixture have common consumer applications in household products, detergents, and cosmetics. These chemicals are used to reduce friction, prevent bacteria growth, and protect the rock formation, making the hydraulic fracturing safer and more efficient.

The well equipment used to produce oil from a well typically includes components that are designed to separate the unwanted substances from the oil. For instance, a conventional sand separator is commonly provided at the surface of the well to remove the sand that may be present as a result of fracking or produced by the formation.

Sand separators are periodically emptied, in a process known as a "blowdown", which evacuates the sand, typically into a blowdown vessel. During a blowdown, the total amount of water and sand accumulated may be known, but the individual proportions thereof may not be readily discernable. Accordingly, this mixture of sand and water is received into the blowdown vessel, which, after one or more blowdown iterations, becomes full and must be emptied, e.g., using a truck fitted with appropriate evacuation equipment. Since the water may not need to be removed from the process, but occupies space in the blowdown vessel and in the truck, it may be useful to reduce the amount of water that is evacuated into the truck. Further, it would be helpful to know how much sand is being produced.

SUMMARY

Embodiments of the disclosure may provide a sand separation system including a separator configured to separate a multi-phase process fluid into a solids and a fluid, a blowdown vessel coupled to the separator, the blowdown vessel configured to receive the solids and a portion of the fluid from the separator, and a fluid removal assembly coupled to the blowdown vessel. The fluid removal assembly is configured to drain at least some of the fluid in the blowdown vessel therefrom, substantially without removing the solids from the blowdown vessel.

Embodiments of the disclosure may also provide a method including receiving a multi-phase process fluid from a well, separating the multi-phase process fluid into a solids and a fluid, directing a first portion of the fluid to a fluid outlet, feeding the solids and a second portion of the fluid to a blowdown vessel, draining at least some of the second portion of the fluid from the blowdown vessel while preventing the solids from draining therewith, determining a sand production rate from the well based on a weight, volume, or both of the solids in the blowdown vessel, and washing the solids from within the blowdown vessel.

Embodiments of the disclosure may further provide a sand separation system including a separator configured to separate a multi-phase process fluid into a solids and a fluid, a blowdown vessel coupled to the separator, the blowdown vessel configured to receive the solids and a portion of the fluid from the separator, and a fluid removal assembly coupled to the blowdown vessel. The fluid removal assembly is configured to drain at least some of the fluid in the blowdown vessel therefrom, substantially without removing the solids from the blowdown vessel. The fluid removal assembly includes an inlet positioned proximal to a bottom of the blowdown vessel, and a screen positioned in the blowdown vessel at the inlet and configured to prevent solids from draining through the inlet. The sand separation system further includes a blowdown drain coupled to the blowdown vessel and configured to evacuate solids therefrom, and a recycle line extending between the fluid removal assembly and the separator. The recycle line is configured to recycle at least some of the fluid drained from the blowdown vessel back into the separator.

BRIEF DESCRIPTION OF THE DRAWINGS

The present disclosure may best be understood by referring to the following description and accompanying drawings that are used to illustrate embodiments of the invention. In the drawings.

DETAILED DESCRIPTION

Figure 1:
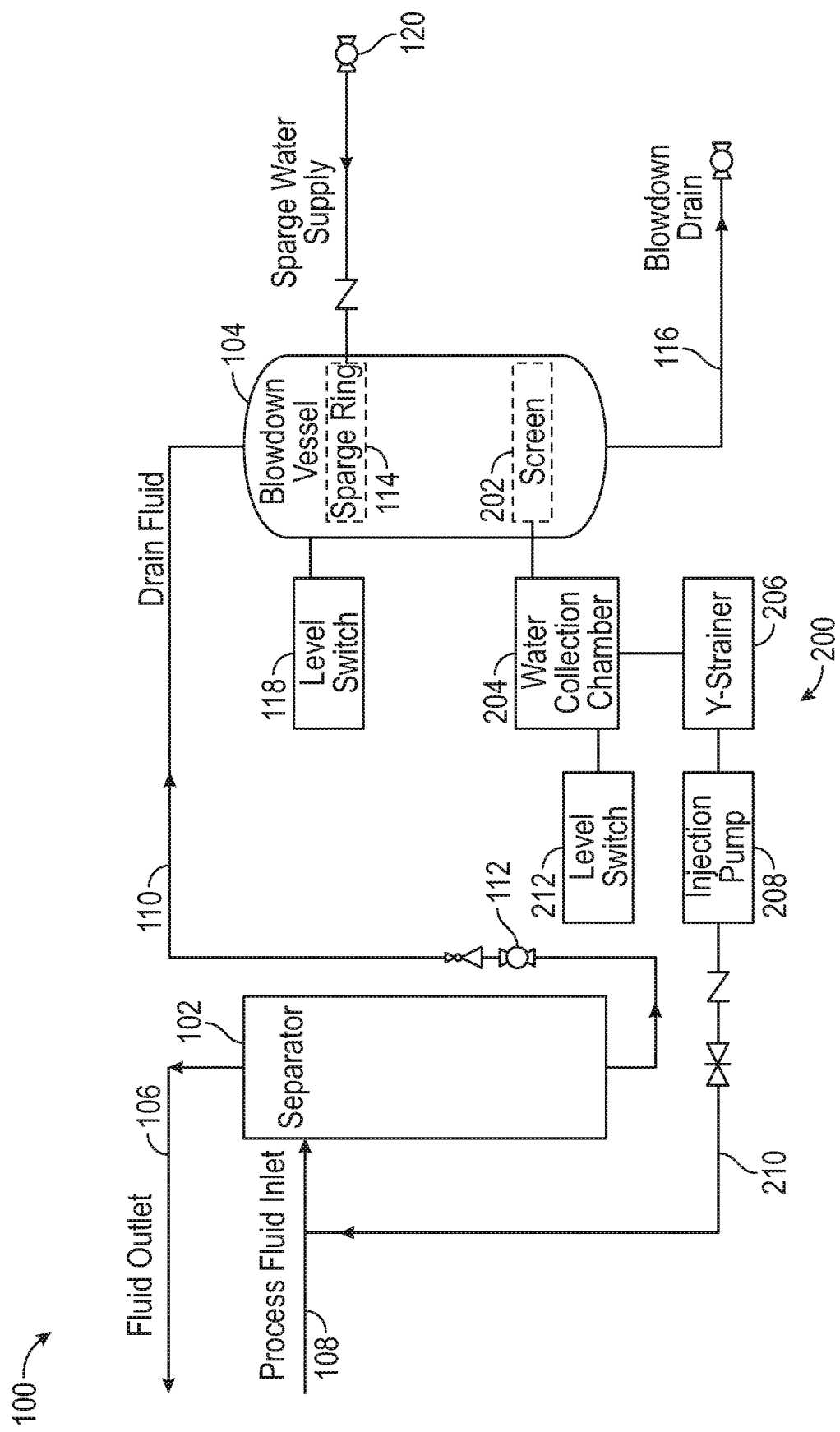
FIG. 1 illustrates a schematic view of a sand separation system with a blowdown vessel fluid removal assembly, according to an embodiment.

The following disclosure describes several embodiments for implementing different features, structures, or functions of the invention. Embodiments of components, arrangements, and configurations are described below to simplify the present disclosure; however, these embodiments are provided merely as examples and are not intended to limit the scope of the invention. Additionally, the present disclosure may repeat reference characters (e.g., numerals) and/or letters in the various embodiments and across the Figures provided herein. This repetition is for the purpose of simplicity and clarity and does not in itself dictate a relationship between the various embodiments and/or configurations discussed in the Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the embodiments presented below may be combined in any combination of ways, e.g., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. In addition, unless otherwise provided herein, "or" statements are intended to be non-exclusive; for example, the statement "A or B" should be considered to mean "A, B, or both A and B."

FIG. 1 illustrates a schematic view of a sand separation system 100, according to an embodiment. The sand separation system 100 generally includes a separator 102 and a blowdown vessel 104. The separator 102 may be any suitable type of fluid-solid separation device, and may include one or more gravity sedimentation tanks, cyclones, rotary separators, etc. The separator 102 may be fed a multi-phase process fluid via a process inlet line 108. The multi-phase process fluid fed via the process inlet line 108 may include fluid and solids in any relative proportion, primarily oil, gas, water and sand, respectively, but other components may be present as well. The multi-phase process fluid may be received from fluid circulated through a well, e.g., as part of a hydraulic fracturing treatment or at a later stage may be the production fluid from the well reservoir The separator 102 may be configured to separate the solids from the fluids. The fluid may exit the separator 102 via a fluid outlet line 106, which may direct the fluid to a gas/oil/water separator where it is then stored in vessels or pumped in to pipelines, e.g. In other embodiments, the fluid may be directed to other types of equipment, e.g., for injection into the well or other uses. A second portion of the fluid (generally much less than the first portion) may remain in the separator 102, along with the separated solids.

The separator 102 may be in communication with the blowdown vessel 104 via a blowdown line 110. Periodically, e.g., at time intervals or in response to operating parameters of the separator 102 or other triggers, a valve 112 in the blowdown line 110 may be opened, allowing the contents of the separator 102 to be drained ("blown-down") into the blowdown vessel 104. As such, the remaining second portion of the fluid and the solids may be evacuated from the separator 102 to the blowdown vessel 104.

The blowdown vessel 104 may include a sparge ring 114, a blowdown drain 116, and a level switch 118. The sparge ring 114 may be connectable to a sparge water supply 120. The sparge water supply 120 may feed water or another fluid to the sparge ring 114, which may distribute the water within the blowdown vessel 104, in order to assist removal of the solids (e.g., sand) therefrom via the blowdown drain 116. In turn, the blowdown drain 116 may be connected to a structure configured to receive the solids and/or fluid, such as a truck equipped with a tank. A valve (not shown) may be provided in the blowdown drain 116 for controlling the drainage of the solids and/or fluid from the blowdown vessel 104, the operation of which may be coordinated with the sparge water supply 120. The level switch 118 may monitor the fluid and/or sand level within the blowdown vessel 104.

The system 100 may further include a fluid removal assembly 200 that is coupled to the blowdown vessel 104 and configured to drain fluid from the blowdown vessel 104, while generally preventing the solids from leaving the blowdown vessel 104. The fluid removal assembly 200 may include an inlet screen 202, a collection chamber 204, a strainer (e.g., a filter) 206, an injection pump 208, and a recycle line 210. The inlet screen 202 may be positioned within the blowdown vessel 104, e.g., such that the inlet screen 202 may be within either the fluid or the solids, after the solids have settled, depending on the volume of fluid and solids introduced into the blowdown vessel 104. The inlet screen 202 may have perforations or slots therein, which may be small enough to at least partially prevent solids from travelling therethrough, while allowing fluids to travel therethrough.

The inlet screen 202 may be in communication with the collection chamber 204, which in some embodiments, may be optionally omitted. In other embodiments, the collection chamber 204 may be provided by a section of pipe, e.g., of the same or a larger diameter than upstream and/or downstream pipe. When the collection chamber 204 is provided, a level switch 212 may monitor the fluid level therein. Once the fluid reaches a predetermined level in the collection chamber 204, the level switch 212 may signal the injection pump 208 to begin pumping. If the collection chamber 204 is omitted, the injection pump 208 may turn on in response to other triggers, or may run continuously so as to directly pump fluid from the blowdown vessel 104.

In the illustrated embodiment, the injection pump 208 is in fluid communication with the collection chamber 204 via the strainer 206. The strainer 206 may be, for example, a Y-strainer, a filter, or any other suitable device that may prevent sand or other particulates that have passed through the inlet screen 202 and, e.g., entered the collection chamber 204, from reaching the injection pump 208 and impacting the useful life thereof.

The injection pump 208 may pump the fluid from the collection chamber 204 into the recycle line 210. The recycle line 210 may be connected to the separator 102. For example, the recycle line 210 may be coupled to the process fluid inlet line 108 or a separate inlet to the separator 102. In another embodiment, the recycle line 210 may be connected to the fluid outlet line 106. In yet another embodiment, the recycle line 210 may be coupled to a tank or another structure configured to receive the fluid pumped by the injection pump 208.

Figure 2:
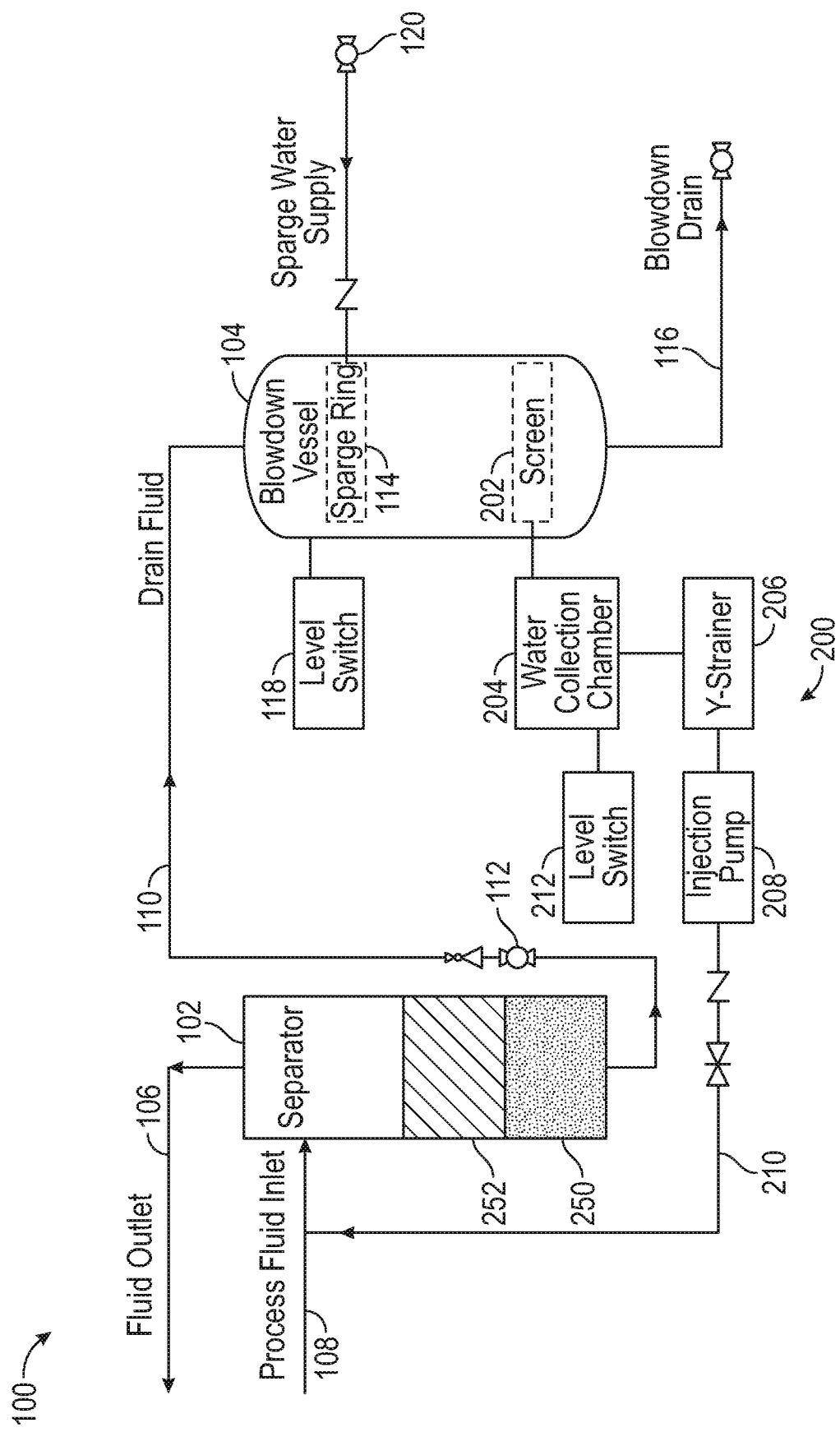
FIGS. 2, 3, and 4 illustrate schematic views of the sand separation system, showing a sequence of operation thereof, according to an embodiment.

FIG. 2 illustrates a schematic view of the separation system 100 at a first operation point, e.g., prior to a blowdown procedure, according to an embodiment. As shown, through normal operation, the separator 102 collects sand and/or other solid matter therein (e.g., solids 250), as well as water and/or other fluids (e.g., fluid 252). The fluid 252 may represent a small portion of the fluid that is separated by the separator 102, with the remainder leaving through the fluid outlet line 106. At some point, whether controlled by time, fluid level, etc., the system 100 may blowdown the separator 102. Accordingly, the valve 112 in the blowdown line 110 may be opened, and at least a portion of the solids 250 and the fluid 252 in the separator 102 may be drained into the blowdown vessel 104.

Figure 3:
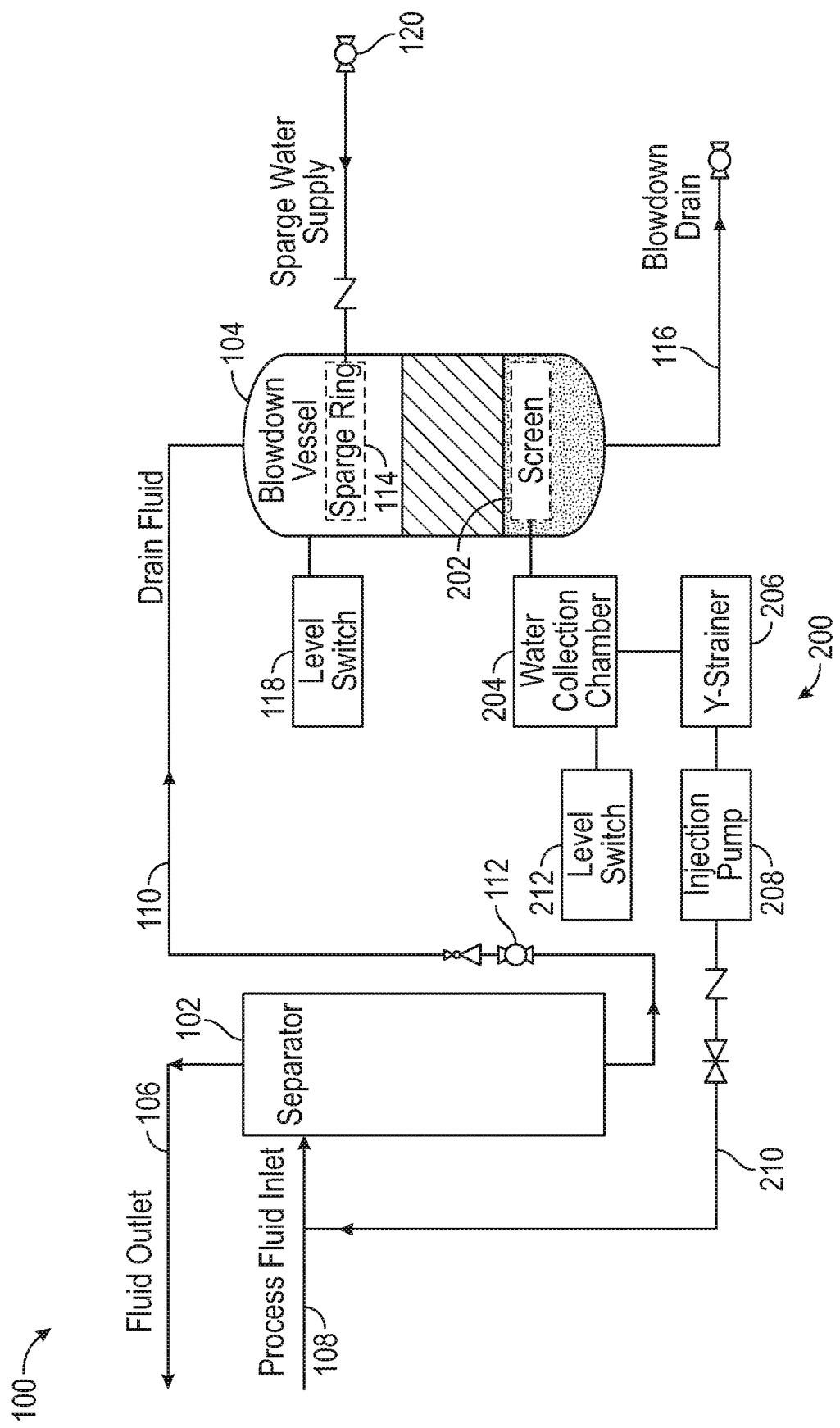

FIG. 3 illustrates a schematic view of the separation system 100 at a second operation point, e.g., after one or more blowdown procedures, according to an embodiment. As shown, the solids 250 and fluid 252 that were in the separator 102 have moved into the blowdown vessel 104. Within the blowdown vessel 104, the solids 250 may settle to the bottom. One or more blowdowns of the separator 102 may occur before the blowdown vessel 104 is drained, or such drainage may be continuous. As mentioned above, the inlet screen 202 may be positioned in the blowdown vessel 104, potentially below the upper level of the solids 250, although the inlet screen 202 may, in some cases, be positioned within the fluid 252, above the solids 250. The fluid 252 may thus flow through the screen 202 and into the collection chamber 204. Eventually, the collection chamber 204 may fill to the extent the level switch 212 indicates to the injection pump 208 to begin pumping, as mentioned earlier, thereby moving the fluid from the collection chamber 204, through the strainer 206 and into the inlet line 108, directly into the separator 102, or to another structure, etc.

Figure 4:
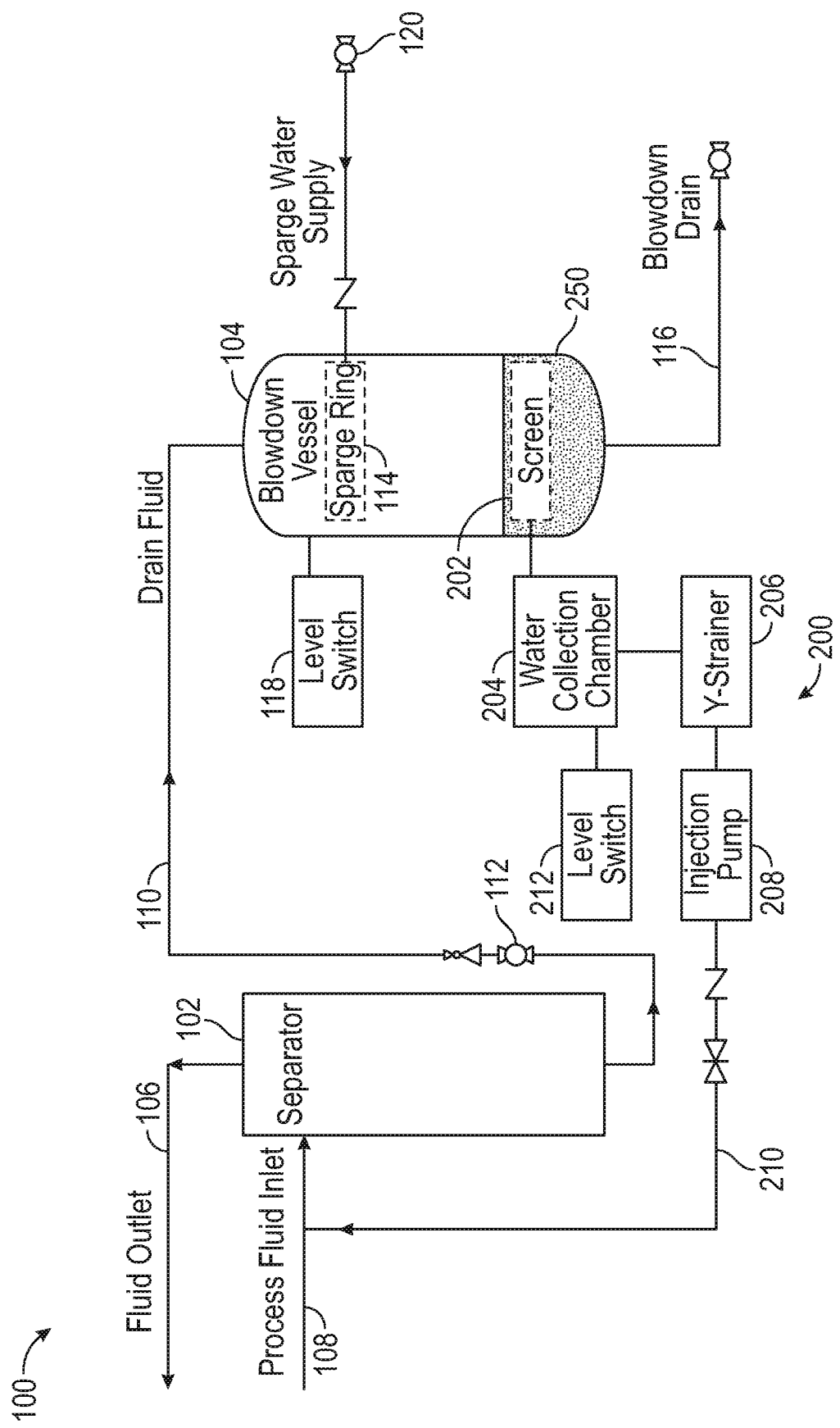

FIG. 4 illustrates a schematic view of the separation system 100 at a third operation point, e.g., after the fluid 252 (see FIG. 3) has been recycled via the fluid removal assembly 200, according to an embodiment. As a result, the blowdown vessel 104 is left substantially without fluid therein, and thus substantially only solids 250 remain (some residual amount of fluid may also remain). The amount of solids 250 may thus be at least approximately determined in the absence of (at least most of) the fluid, e.g., based on the weight of the blowdown vessel 104 in comparison to its known empty weight. In other embodiments, the amount of solids 250 may be determined using a level sensor, such as an ultrasonic, radar, flapper wheel, electrical, or optical sensor, which may be configured to determine the level of the solids 250 in the blowdown vessel 104. With the geometry of the blowdown vessel 104 known, the volume of solids 250 in the blowdown vessel 104 may thus be determined based on its level within the blowdown vessel 104.

Determining the amount of solids 250 in the blowdown vessel 104 may allow operators to determine the rate of sand production in the process fluid received from the well. Further, recycling the fluids from the blowdown vessel 104 may reduce the frequency with which the solids are removed from the blowdown vessel 104.

The solids 250 may be removed or "washed" from the blowdown vessel 104 via a combination of the operation of the sparge ring 114 and the blowdown drain 116. For example, the sparge water supply 120 may be connected or otherwise allowed to feed water or another fluid to the sparge ring 114, which may distribute water into the blowdown vessel 104. At generally the same time, the blowdown drain 116 may be opened, allowing the solids 250, mixed with fluid from the sparge ring 114, to wash out of the blowdown vessel 104 and, e.g., into a "vac" truck connected to the blowdown drain 116. As a result, all or at least some of the solids 250 may be removed from the blowdown vessel 104, e.g., resulting in an empty system as shown in FIG. 1, which is ready for additional separation operation. It will be appreciated, however, that washing the solids from the blowdown vessel 104 may occur while the separator 102 is in normal use, including continuing to collect solids therein.

Figure 5:
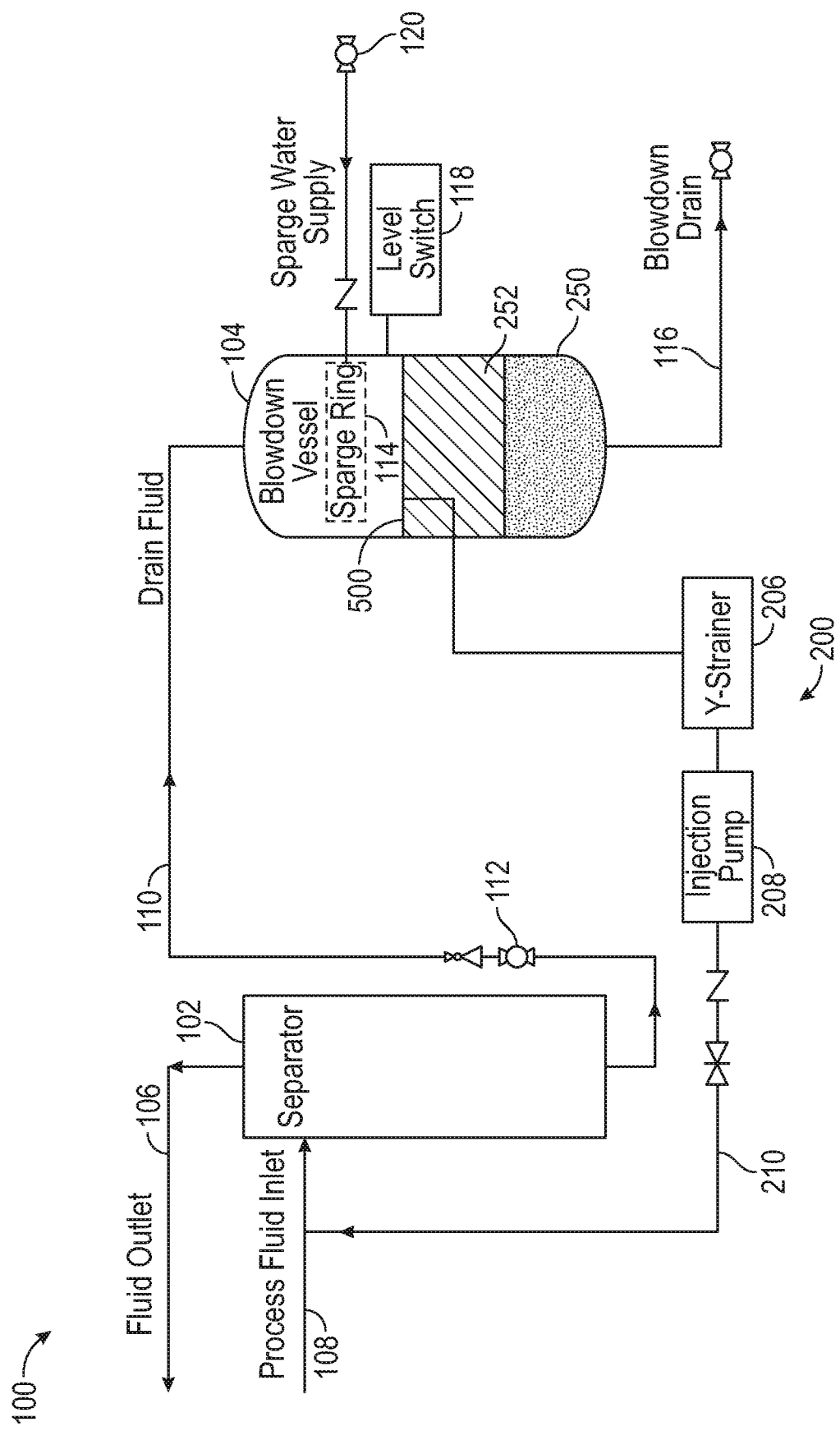
FIG. 5 illustrates a schematic view of another embodiment of the sand separation system.

FIG. 5 illustrates another embodiment of the sand separation system 100. Similar components and workpieces are given the same numbers in FIG. 5 as in FIGS. 1-4, and duplicative descriptions of the structures and functions thereof are omitted herein. As shown, in FIG. 5, the collection chamber 204 and the inlet screen 202 may be omitted. Instead, an inlet 500 is provided within the blowdown vessel 104 at a predetermined level. The predetermined level may be generally higher than the level that the solids 250 are allowed to reach before draining the blowdown vessel 104. The level switch 118 may determine when the level of the fluids 252 exceeds the predetermined level, signaling the injection pump 208 to run when this occurs. As such, the inlet 500 may receive substantially fluid, e.g., after the solids 250 are allowed to settle to the bottom of the vessel 104, below the level of the inlet 500. This assembly may result in the level of the fluid 252 being kept at or near the predetermined level during operation.

In this embodiment, the volume of solids 250 in the blowdown vessel 104 may be calculated, at least approximately. The weight of the blowdown vessel 104, when empty, may be known, and the weight of the blowdown vessel 104 during use may be measured. The volume of the blowdown vessel 104 may also be known, as are the densities of sand and water. As such, the relative volume of the sand and water (assuming the solids 250 are substantially made up of sand, and the fluids 252 are substantially made up of water) can be calculated, at least approximately.

Figure 6:
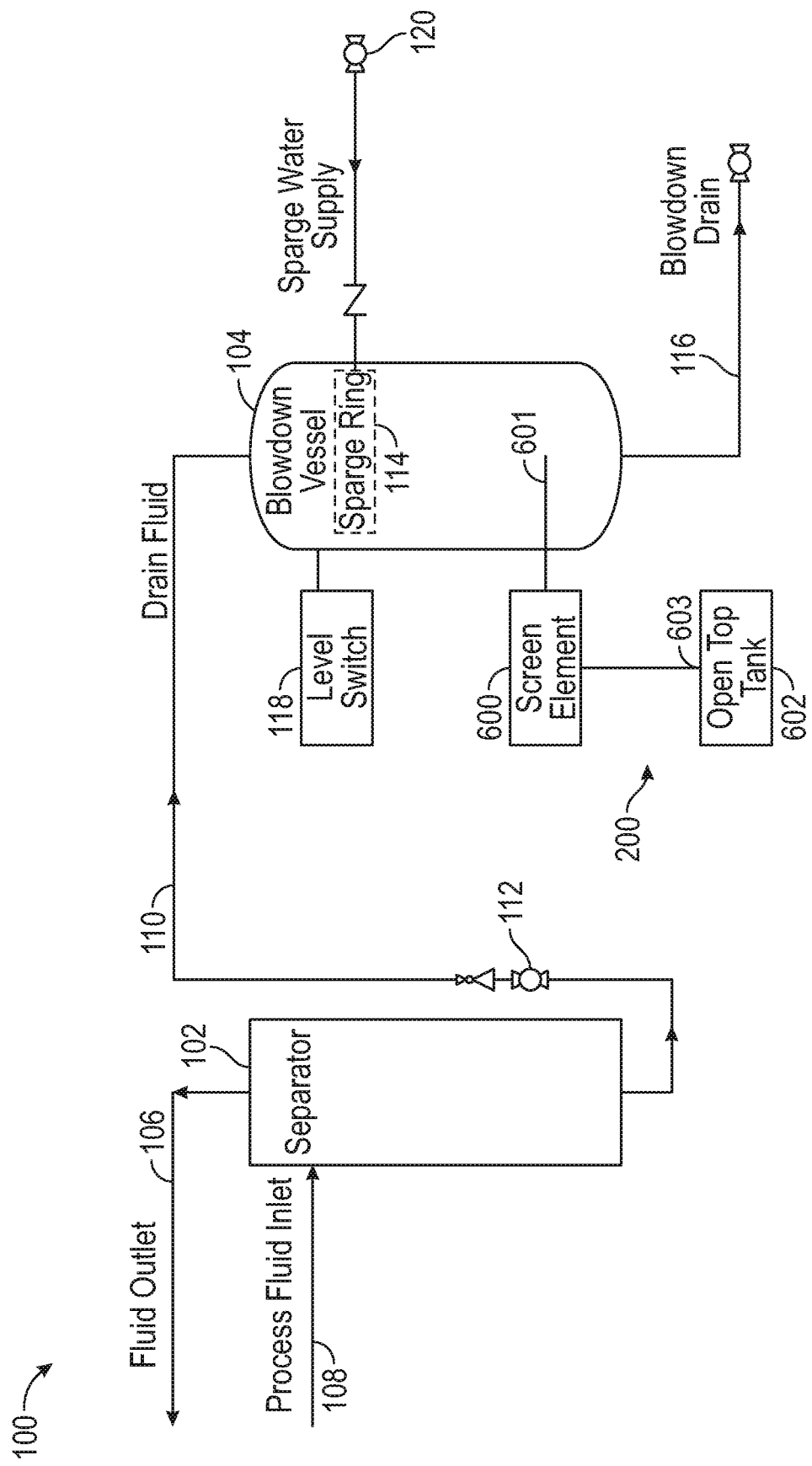
FIG. 6 illustrates a schematic view of another embodiment of the sand separation system.

FIG. 6 illustrates another embodiment of the sand separation system 100. Similar components and workpieces are given the same numbers in FIG. 6 as in FIGS. 1-4, and duplicative descriptions of the structures and functions thereof are omitted herein. In this embodiment, the fluid removal assembly 200 feeds fluid drained from the blowdown vessel 104 through an inlet 601, to an outlet 603, and into a storage vessel, which, as shown, may be an open top tank 602. A screen element 600 may be provided to prevent solids (sand) from exiting the blowdown vessel 104 via the fluid removal assembly 200. In some embodiments, the screen element 600 may be part of the inlet 601. The tank 602 may save the fluids (water) for subsequent use, e.g., as part of hydraulic fracturing operations, or for any other suitable use.

Figure 7:
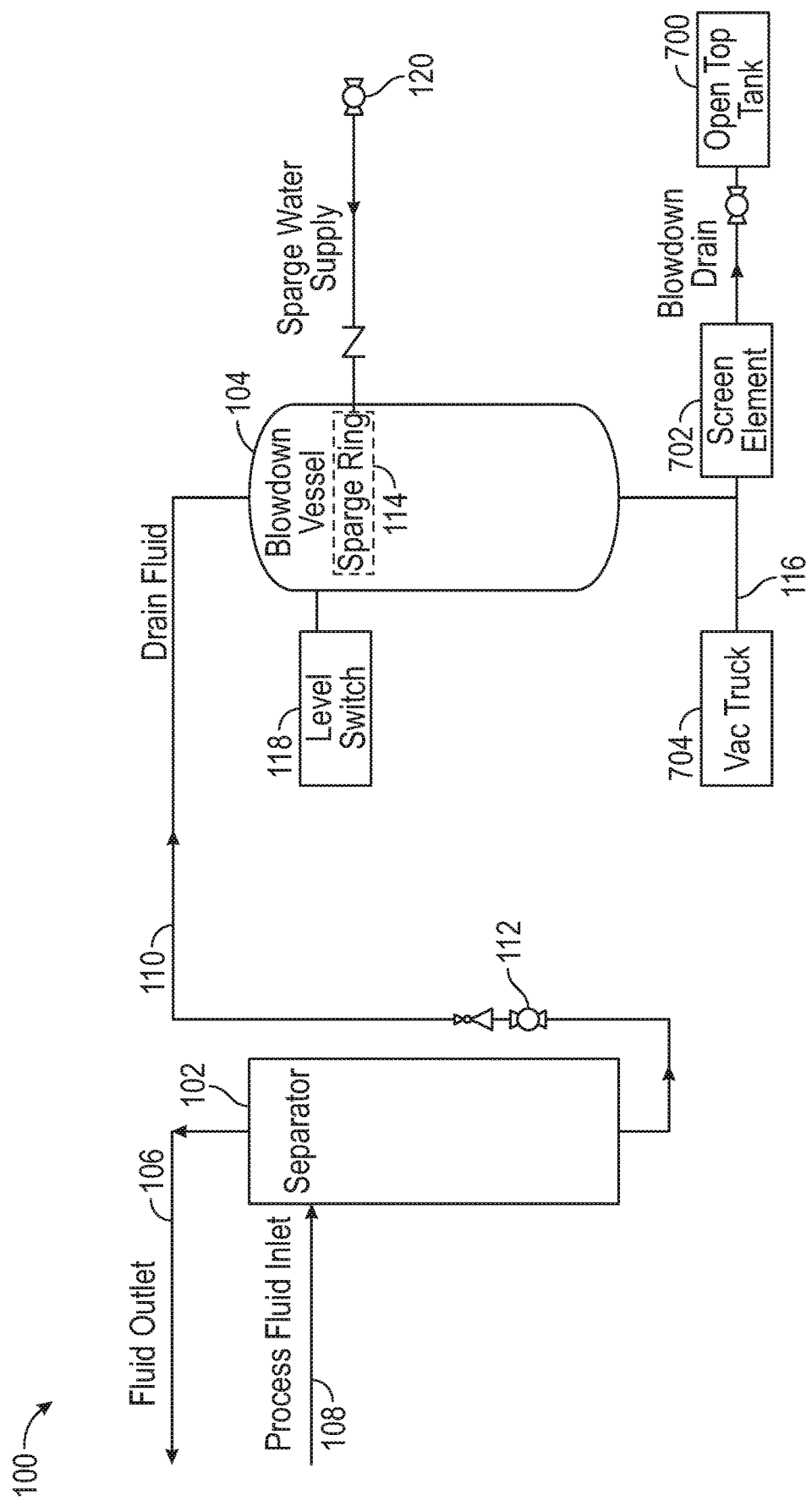
FIG. 7 illustrates a schematic view of another embodiment of the sand separation system.

FIG. 7 illustrates another embodiment of the sand separation system 100. Similar components and workpieces are given the same numbers in FIG. 7 as in FIGS. 1-4, and duplicative descriptions of the structures and functions thereof are omitted herein. The illustrated embodiment combines the fluid removal assembly 200, a vac truck 704, and the blowdown drain 116. Accordingly, storage vessel (e.g., an open top tank 700) is provided, which receives the fluid drained from the vessel 104. A screen element 702 is provided to prevent the solids from being drained as well. To drain the solids, the blowdown drain 116 is opened, allowing the solids to be drained (e.g., with the help of the water from the sparge ring 114) therethrough.

Figure 8:
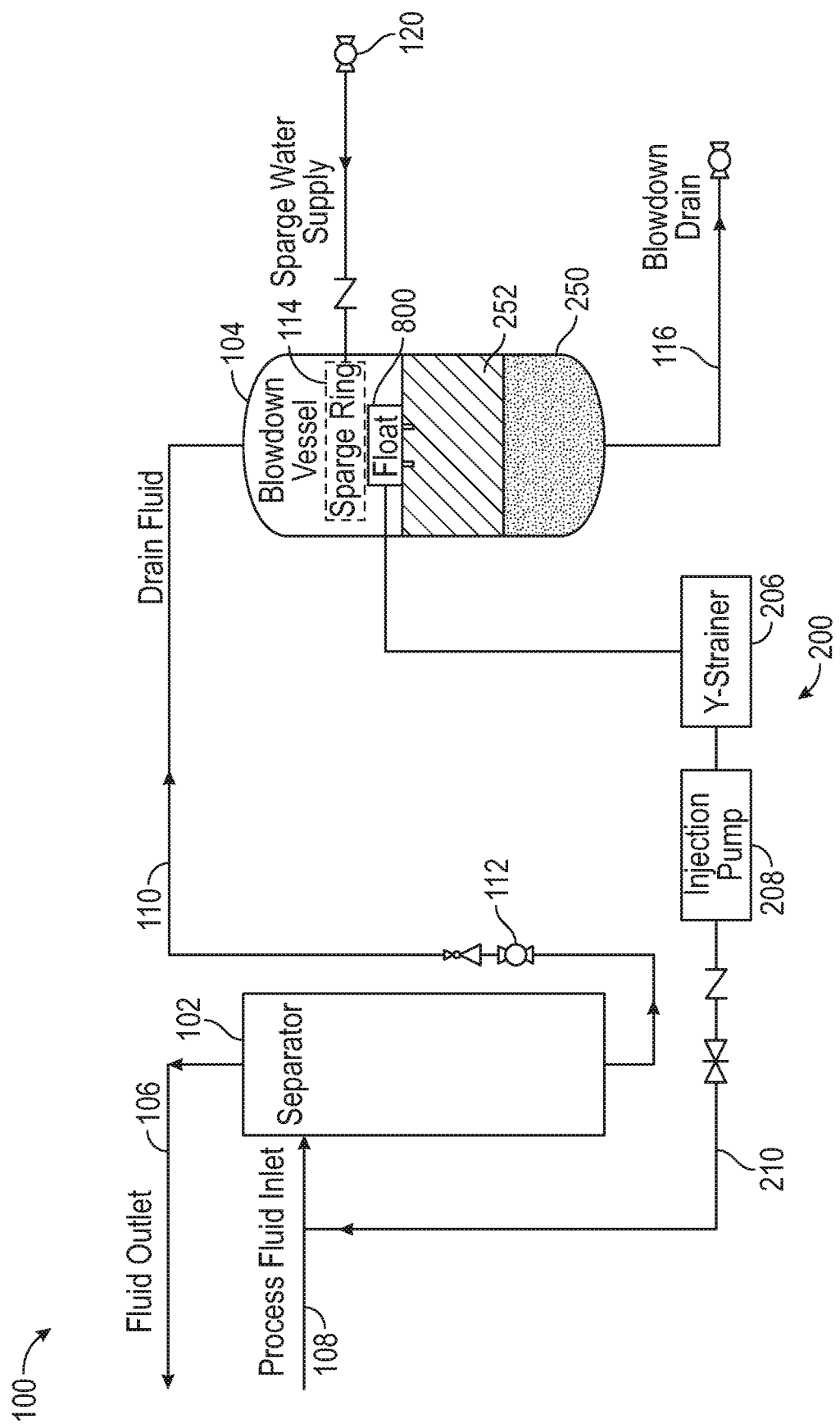
FIG. 8 illustrates a schematic view of another embodiment of the sand separation system.

FIG. 8 illustrates another embodiment of the sand separation system 100. Similar components and workpieces are given the same numbers in FIG. 8 as in FIGS. 1-4, and duplicative descriptions of the structures and functions thereof are omitted herein. In this embodiment, a floating inlet 800 is positioned in the blowdown vessel 104. The floating inlet 800 may serve to allow the injection pump 208 to drain fluid 252 from the blowdown vessel 104 until the floating inlet 800 is resting on the solids 250. The floating inlet 800, when resting on the solids 250, may signal to the injection pump 208 to cease pumping, and, when floating, may signal to the injection pump 208 to pump.

Figure 9:
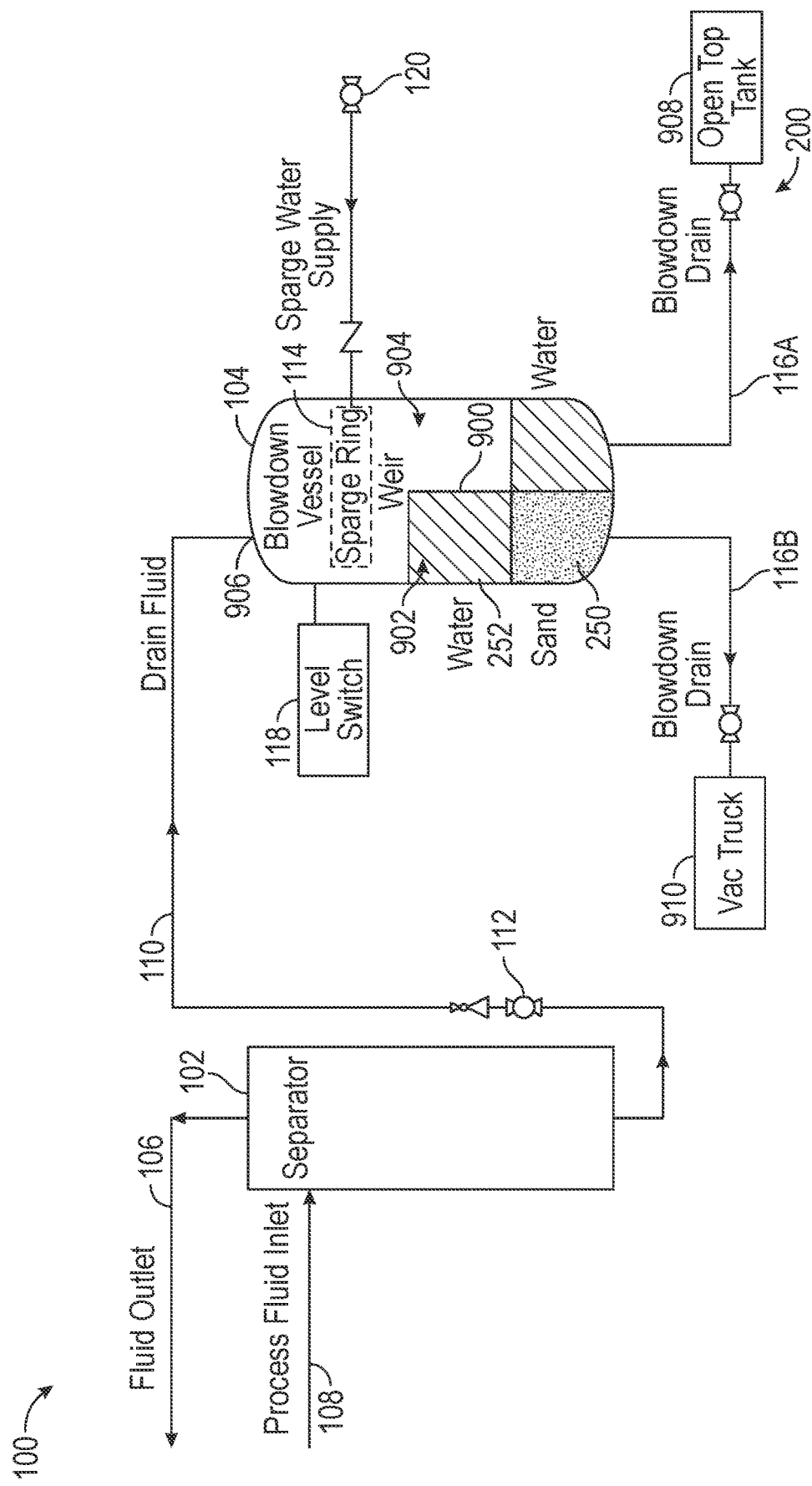
FIG. 9 illustrates a schematic view of another embodiment of the sand separation system.

FIG. 9 illustrates another embodiment of the sand separation system 100. Similar components and workpieces are given the same numbers in FIG. 9 as in FIGS. 1-4, and duplicative descriptions of the structures and functions thereof are omitted herein. In the embodiment of FIG. 9, a vertical plate or weir 900 is positioned in the blowdown vessel 104. The weir 900 may extend from the bottom of the blowdown vessel 104 to a position proximal to the top, but below the sparge ring 114. The weir 900 may thus define two vertical sections 902, 904 within the internal volume of the blowdown vessel 104.

The blowdown line 110, extending from the separator 102, may have an outlet 906, which may be aligned with the vertical section 902, and may thus deposit the mixture of solids 250 and fluids 252 from the separator 102 into the vertical section 902. The solids 250 may settle to the bottom of the vertical section 902, while the fluid 252 float above. Eventually, the introduction of the solids 250 and fluid 252 may cause the top of the fluid 252 to spill over the weir 900 and into the vertical section 904. As such, the vertical section 904 may contain substantially fluid 252. The fluid removal assembly 200 may thus be coupled to the bottom of the blowdown vessel 104 so as to communicate with the vertical section 904 and receive the fluid 252 therefrom. The fluid removal assembly 200 may include a storage vessel 908, which may be an open top tank, for storing the fluid 252. As shown, a blowdown drain 116A may be positioned between the blowdown vessel 104 and the fluid removal assembly 200 (e.g., the storage vessel 908). In other embodiments, the fluid removal assembly 200 may include a pump, chamber, and fluid line, so as to send the drained fluid 252 back to the process inlet line 108, directly back to the separator 102, or to the fluid outlet line 106.

As also shown, another blowdown drain 116B may be coupled to the bottom of the blowdown vessel 104 and may communicate with the vertical section 902. A "vac" truck 910 may be coupled to the blowdown drain 116. Thus, when the blowdown vessel 104 is drained, at least the solids 250 may be washed through the blowdown drain 116B and into the vac truck 910.

Figure 10:
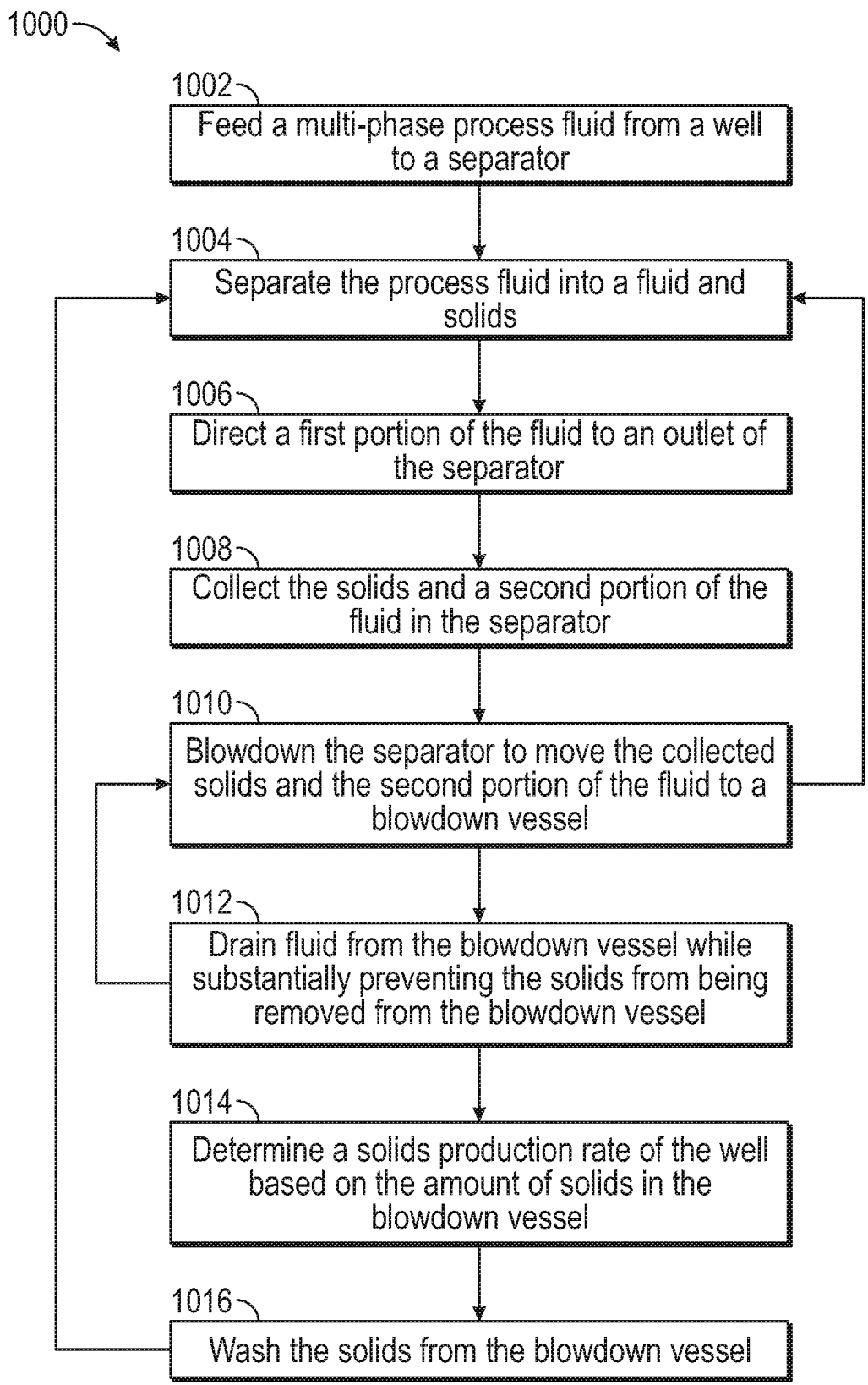
FIG. 10 illustrates a flowchart of a method for sand separation, according to an embodiment.

FIG. 10 illustrates a flowchart of a method 1000 for sand separation, according to an embodiment. The method 1000 may proceed by operation of one or more embodiments of the sand separation system 100 discussed above. The method 1000 may begin by feeding a multi-phase process fluid to a separator 102, as at 1002. The separator 102 may separate the process fluid into a solid 250 and a fluid 252, as at 1004. A first portion of the fluid 252 may be received into a separator fluid outlet line 106 and fed back, e.g., to a storage vessel, hydraulic fracturing system, or the like, as at 1006.

The separated solids 250 and a second portion of the fluid 252 may be collected within the separator 102, as at 1008. This is shown in FIG. 2, as discussed above, according to an embodiment. At some point, e.g., according to a predetermined interval, separator efficiency, or any other trigger, the separator 102 may be blown-down to evacuate the solids 250 and the fluids 252 therefrom, as at 1010. The evacuated solids 250 and fluids 252 are sent to the blowdown vessel 104 via the blowdown line 110, as shown, e.g., in FIG. 3. During and/or after such blowdown, the method 1000 may include continuing to separate the process fluid at 1004.

Fluids 252 in the blowdown vessel 104 may be drained therefrom using a fluid removal assembly 200, while leaving the solids 250 substantially contained within the blowdown vessel 104, as at 1012. This may occur, for example, after delaying for a duration subsequent to the blowdown procedure at 1010, thereby allowing the solids to settle to the bottom of the blowdown vessel 104. The fluid removal assembly 200 may take several different forms, as described above. For example, as shown in FIG. 1, the fluid removal assembly 200 may drain the fluid 252 using the injection pump 208 configured to pull fluid through an inlet screen 202 or, as shown in FIG. 8, may pump the fluid through a floating inlet 800. The injection pump 208 may inject the fluid back into the separator 102 (e.g., via the inlet line 108). In some embodiments, such as shown in FIG. 5, the fluid 252 may not be entirely drained, but may be drained to a predetermined level. Alternatively, the fluid may be drained, e.g., by gravity, into a tank for storage therein. In some embodiments, such as that shown in FIG. 9, the blowdown vessel 104 may include the weir 900, which may avoid or mitigate a necessity for screens and filters to prevent the solids 250 from being drained along with the fluid 252.

When the fluid 252 is drained (e.g., substantially entirely or to a predetermined level) at 1012, the amount of solids (e.g., sand) in the blowdown vessel 104 may be determined. The amount of sand may be determined based on the change in weight of the blowdown vessel 104 that occurs by draining. In embodiments in which the fluid is substantially removed, the change in weight may represent solids content. In embodiments in which the fluid is drawn to a particular, predetermined level, the density of the solids 250, the density of the fluids 252, and the geometry of the blowdown vessel 104 may be employed, along with the change in weight of the blowdown vessel 104, to determine the amount of solids 250 in the vessel 104.

With the amount of sand content in the vessel 104, the rate at which the well is producing solid (e.g., sand) may be determinable by comparing the increase in solid blowndown to the blowdown vessel 104 over the amount of time between blowdown operations, as at 1014. With the rate at which solids are produced from the well known, the frequency at which the separator 102 is blowdown may be adjusted for efficiency, such that the separator 102 is full, but not overfull, when a blowdown is initiated. Furthermore, the frequency with which the blowdown vessel 104 is drained may be efficiently determined, since the fluid is removed therefrom, such frequency may depend on the amount of solids produced from the well, separated in the separator 102, and blown-down to the blowdown vessel 104.

Finally, the separator 102 may be blowdown at 1006 one or more times, and at some point, e.g., according to a solids/fluids level in the blowdown vessel 104, the vessel 104 may be drained, as at 1016. This may leave the blowdown vessel 104 substantially empty, and the separation, blowdown, and wash out process may be repeated.

As used herein, the terms "inner" and "outer"; "up" and "down"; "upper" and "lower"; "upward" and "downward"; "above" and "below"; "inward" and "outward"; "uphole" and "downhole"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A solids separation system, comprising:
a separator configured to separate a multi-phase process fluid into a solids and a fluid;
a blowdown vessel coupled to the separator, wherein the blowdown vessel is configured to receive the solids and the fluid from the separator, wherein a frequency at which the blowdown vessel is to be drained is determined based at least partially upon an amount of the solids separated from the multi-phase process fluid in the separator; and
a fluid removal assembly coupled to the blowdown vessel, wherein the fluid removal assembly is configured to drain at least some of the fluid in the blowdown vessel therefrom, substantially without removing the solids from the blowdown vessel, wherein the fluid removal assembly comprises:
an inlet screen positioned within the blowdown vessel; and
a collection chamber in fluid communication with the inlet screen and downstream from the blowdown vessel, wherein the fluid flows through the inlet screen and into the collection chamber, and wherein the inlet screen prevents the solids from flowing therethrough and into the collection chamber.

2. The solids separation system of claim 1, further comprising a blowdown drain configured to drain the solids from within the blowdown vessel.

3. The solids separation system of claim 2, further comprising a sparge ring positioned in the blowdown vessel, wherein the sparge ring receives a different fluid to wash the solids into the blowdown drain.

4. The solids separation system of claim 1, wherein the fluid removal assembly also comprises:
an injection pump in fluid communication with the collection chamber, wherein the injection pump is configured to pump the fluid from the collection chamber through the injection pump.

5. The solids separation system of claim 4, wherein the fluid removal assembly also comprises:
a level switch configured to detect a minimum fluid level in the collection chamber; and
a strainer in communication with the collection chamber, wherein the injection pump communicates with the inlet screen via the collection chamber and the strainer, and wherein the injection pump is configured to intermittently pump the fluid received in the collection chamber in response to the level switch detecting at least the minimum fluid level.

6. The solids separation system of claim 4, wherein the fluid removal assembly further comprises a fluid recycle line communicating with the injection pump, wherein the fluid recycle line is fluidly coupled to the separator or to a process fluid inlet line of the separator, and wherein the fluid removal assembly is configured to feed the fluid drained from within the blowdown vessel through the collection chamber, the injection pump, and the fluid recycle line to the separator.

7. The solids separation system of claim 4, wherein the inlet screen is configured to float on a surface of the fluid received into the blowdown vessel, and wherein the injection pump is configured to pump the fluid through the inlet screen in response to the inlet screen floating on the surface of the fluid, and to stop pumping in response to the inlet screen not floating.

8. The solids separation system of claim 4, wherein the inlet screen is positioned at a predetermined level within the blowdown vessel, and wherein the injection pump is configured to pump only when a fluid level in the blowdown vessel meets or exceeds the predetermined level.

9. The solids separation system of claim 1, wherein:
the blowdown vessel comprises a weir that defines a first section and a second section within the blowdown vessel, wherein the blowdown vessel is configured such that the solids and the fluid are received into the first section, and at least some of the fluid overflows past the weir and into the second section; and
the inlet screen is in communication with the second section, wherein the inlet screen receives the at least some of the fluid from the second section.

10. The solids separation system of claim 1, wherein the fluid removal assembly also comprises:
a y-strainer downstream from the collection chamber;
a level switch configured to determine a level of the fluid in the collection chamber; and
an injection pump downstream from the y-strainer, wherein the injection pump is configured to pump the fluid from the collection chamber, through the y-strainer and the injection pump, and back into the separator in response to the level of the fluid in the collection chamber reaching a predetermined level.

11. The solids separation system of claim 1, wherein a sand production rate from a well is determined based on a weight, volume, or both of the solids in the blowdown vessel, and wherein a frequency at which the separator is blown-down is adjusted based upon the sand production rate.

12. The solids separation system of claim 1, wherein the frequency at which the blowdown vessel is to be drained is also determined based at least partially upon an amount of the solids blown-down to the blowdown vessel.

13. The solids separation system of claim 12, wherein the frequency at which the blowdown vessel is to be drained is also determined based partially upon an amount of the solids produced from a well.

14. A method comprising:
receiving a multi-phase process fluid from a well;
separating the multi-phase process fluid into a solids and a fluid;
directing a first portion of the fluid to a fluid outlet;
feeding the solids and a second portion of the fluid to a blowdown vessel;
draining at least some of the second portion of the fluid from the blowdown vessel while preventing the solids from draining therewith, wherein draining the at least some of the second portion of the fluid from the blowdown vessel comprises causing the at least some of the second portion of the fluid to flow through an inlet screen and into a collection chamber that is downstream from the blowdown vessel, wherein the inlet screen substantially prevents the solids from flowing therethrough and into the collection chamber, and wherein the inlet screen is positioned within the blowdown vessel;
determining a sand production rate from the well based on a weight, volume, or both of the solids in the blowdown vessel; and draining the solids from within the blowdown vessel, wherein a frequency at which the blowdown vessel is to be drained is determined based at least partially upon an amount of the solids separated from the multi-phase process fluid.

15. The method of claim 14, further comprising:

determining that the at least some of the second portion of the fluid in the collection chamber has reached a minimum level; and in response to determining that the at least some of the second portion of the fluid in the collection chamber has reached the minimum level, pumping the at least some of the second portion of the fluid out of the collection chamber using a pump.

16. The method of claim 15, further comprising recycling the at least some of the second portion of the fluid pumped by the pump into a separator, wherein the separator separates the multi-phase process fluid into the solids and the fluid.

17. The method of claim 14, wherein:

draining the at least some of the second portion of the fluid from the blowdown vessel comprises receiving the at least some of the second portion of the fluid through the inlet screen positioned at a certain level in the blowdown vessel; and determining a solids production rate from the well by determining an amount of the solids in the blowdown vessel based on a weight of the blowdown vessel, a volume of the blowdown vessel, a density of the solids, and a density of the at least some of the second portion of the fluid.

18. The method of claim 14, wherein draining the at least some of the second portion of the fluid from the blowdown vessel comprises receiving the at least some of the second portion of the fluid through the inlet screen which floats on a surface of the second portion of the fluid in the blowdown vessel.

19. The method of claim 14, wherein draining the at least some of the second portion of the fluid from the blowdown vessel comprises:

waiting for a predetermined duration after feeding the solids and the at least some of the second portion of the fluid to the blowdown vessel, to allow the solids to settle in the blowdown vessel; and pumping the at least some of the second portion of the fluid from within the blowdown vessel.

20. The method of claim 14, wherein:

feeding the solids and the second portion of the fluid to the blowdown vessel comprises:

directing the solids and the second portion of the fluid to a first section of the blowdown vessel, wherein a weir partitions the first section from a second section of the blowdown vessel;

permitting the at least some of the second portion of the fluid in the first section to overflow past the weir and into the second section, wherein the solids are substantially prevented from entering the second section by the weir; and draining the blowdown vessel comprises draining the at least some of the second portion from the second section.

21. The method of claim 14, further comprising adjusting a frequency at which a separator is blown-down based upon the sand production rate.

22. A solids separation system, comprising:

a separator configured to separate a multi-phase process fluid into a solids and a fluid;

a blowdown vessel coupled to the separator, wherein the blowdown vessel is configured to receive the solids and a portion of the fluid from the separator;

a fluid removal assembly coupled to the blowdown vessel, wherein the fluid removal assembly is configured to drain at least some of the fluid in the blowdown vessel therefrom, substantially without removing the solids from the blowdown vessel, wherein the fluid removal assembly comprises:

an inlet screen positioned proximal to a bottom of the blowdown vessel, wherein the inlet screen is configured to prevent the solids from draining therethrough; and a collection chamber in fluid communication with the inlet screen and downstream from the blowdown vessel, wherein the fluid flows through the inlet screen and into the collection chamber, and wherein the inlet screen prevents the solids from flowing therethrough and into the collection chamber;

a blowdown drain coupled to the blowdown vessel and configured to evacuate the solids therefrom, wherein a frequency at which the blowdown vessel is to be drained is determined based upon an amount of the solids produced from a well, an amount of the solids separated from the multi-phase process fluid in the separator, and an amount of the solids blown-down to the blowdown vessel; and a recycle line extending between the collection chamber and the separator, wherein the recycle line is configured to recycle the at least some of the fluid drained into the collection chamber back into the separator.

23. The solids separation system of claim 22, wherein the fluid removal assembly further comprises:

a pump coupled to the collection chamber and the recycle line; and a level switch in communication with the collection chamber, wherein the pump is configured to pump the fluid from the collection chamber in response to the level switch actuating.

* * * * *